UNITED STATES PATENT OFFICE.

THOMAS STORER, OF GLASGOW, SCOTLAND.

PROCESS OF EXTRACTING NICKEL FROM NICKEL ORES.

SPECIFICATION forming part of Letters Patent No. 603,797, dated May 10, 1898.

Application filed June 12, 1897. Serial No. 640,574. (No specimens.)

*To all whom it may concern:*

Be it known that I, THOMAS STORER, a citizen of England, residing at Sanchiehall street, Glasgow, in the county of Lanark, Scotland, have invented certain new and useful improvements in the treatment of nickel ores for extraction of the nickel and the production of iron-oxid pigment, of which the following is a specification.

This invention has for its object the extraction of nickel from its ores and the production by the same process of pigments consisting of iron oxids. It is especially adapted to such ores as contain silicates or hydrated silicates of nickel, such as the well-known nickel ores of New Caledonia, and to such ores as contain oxids or hydrated oxids of nickel. The general composition of these New Caledonia nickel ores is as follows:

|   | Per cent. |
|---|---|
| Oxid of nickel | 11.08 |
| Ferric oxid | 7.34 |
| Alumina | 1.56 |
| Lime | 1.90 |
| Magnesia | 22.50 |
| Silica, with a small quantity of chrome ore | 37.96 |
| Combined water and free moisture | 17.30 |
| Total | 99.64 |

The composition of this ore of course varies somewhat, and my process is especially applicable to this general character of ore as distinguished from pyrrhotite and similar ores containing sulfur or sulfur compounds.

According to this process the ore is treated in a finely-divided condition (preferably such as to pass through a sieve having sixty meshes to the linear inch) with a ferric salt, preferably ferric chlorid, ($FeCl_3$,) in solution, in a closed vessel, (which may be steam-jacketed,) at a temperature which may be about 370° Fahrenheit, and under corresponding pressure. By thus heating from five to eight hours a double decomposition takes place. The nickel enters into solution as chlorid and iron is thrown down as oxid in the form of a fine red pigment of high quality. After the reaction is completed the charge is withdrawn, the solution of chlorid of nickel is filtered off, and the iron oxid, which is insoluble, is washed and dried, being then ready for use. The nickel may be electrolytically deposited from the solution or precipitated as oxid or hydrated oxid by addition of caustic alkali or otherwise. The oxid of nickel thus obtained may be reduced to metal in the ordinary way or it may be combined with acids to form salts. Good results are obtained by employing a solution of ferric chlorid containing about twenty-six and one-half per cent. of dry chlorid, using about seventeen hundred pounds of dry chlorid per ton of ore. The proportions, however, may be varied to suit the character of the ore; but the above proportions are suitable for ores containing five to eight per cent. of nickel. Also the temperature under which the ore is treated and the strength of the chlorid solution may be varied, thus varying the color of the resultant iron oxid.

Such being the general character of the invention, the following example shows how it may be carried out in practice: One part, by weight, of the finely-ground New Caledonia nickel ore and two and three-fourths parts, by weight, of the solution of ferric chlorid (commonly known as "perchlorid of iron") having a strength of twenty-six and one-half per cent., or containing that percentage of the solid substance, are put in a strong closed vessel, which may be made of iron or steel, enameled, provided with a stirrer and steam-jacket or other means of heating. The temperature is raised to 370° Fahrenheit, or thereabout, developing a corresponding internal pressure, and the contents are occasionally stirred during about five hours. The contents are then discharged, these consisting of a solution of nickel and an insoluble substance which is the brilliant red oxid-of-iron pigment. These are separated by settling and decantation or by filtering or filter-pressing, or otherwise. The solution is then treated in any known way to recover the nickel and the oxid-of-iron pigment is washed with water, after which it is ready for use.

The nickel solution may contain a small proportion of ferrous salt, which is easily removed by agitation with a little carbonate of lime before recovering the nickel.

By operating in the above manner practically the whole of the nickel is obtained in solution, while the red pigment is of a brilliant color, rivaling or excelling any other iron-oxid pigment, either natural or artificial, at present known.

Although ferric salts generally give a pigment when treated with New Caledonia nickel ores according to the above process, the product so prepared is of an inferior color, and therefore the ferric chlorid is to be preferred, as it gives the bright red which is so much esteemed and is of much higher value.

Having now particularly described and ascertained the nature of this invention and in what manner the same is to be performed, I declare that I make no general claim to the treatment of nickel or other ores with ferric salts at low temperatures; but

What I claim is—

The process of treating New Caledonia nickel ores, and ores of similar composition, containing silicates or hydrated silicates of nickel, so as to obtain nickel salt in solution and a bright-red iron-oxid pigment, the said process consisting in mixing the ore with a solution of ferric chlorid, and heating the mixture in a closed vessel to a temperature of about 370° Fahrenheit under corresponding pressure, substantially as described.

In testimony whereof I have signed my name to this specification, in the presence of two subscribing witnesses, this 27th day of May, A. D. 1897.

THOMAS STORER.

Witnesses:
JOHN KELLY,
CHAS. C. MAXTONE.